Figure 1:
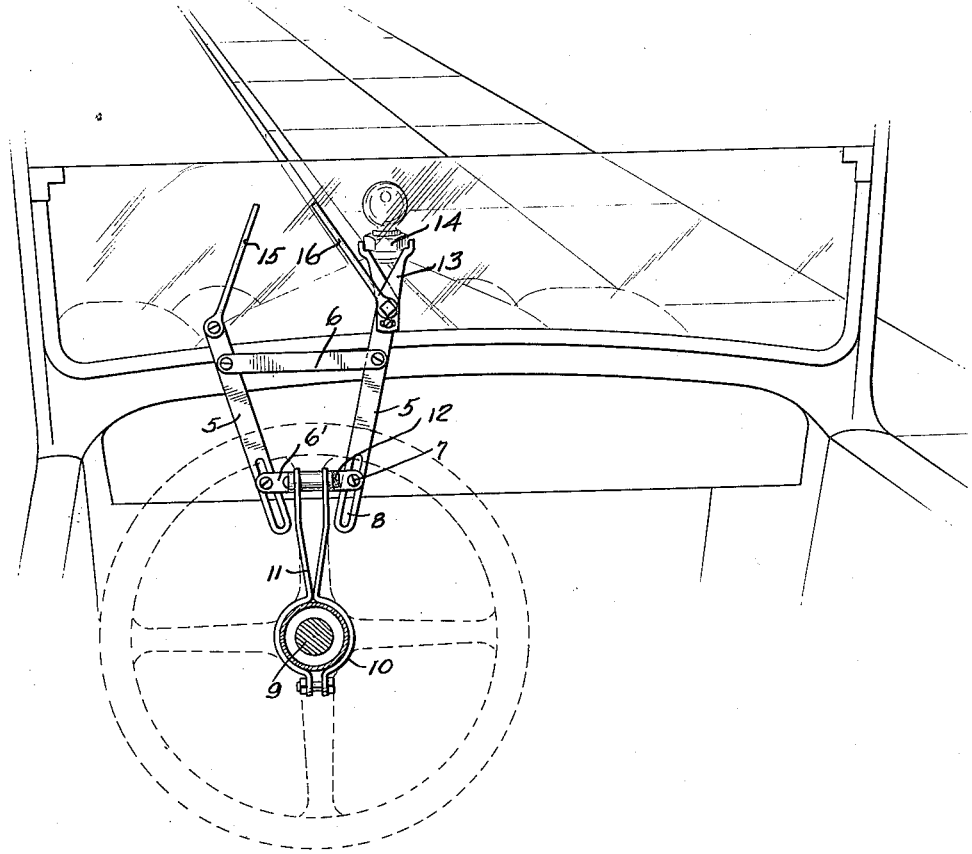

I. A. ROMMER.
GUIDE.
APPLICATION FILED AUG. 2, 1921.

1,429,166.

Patented Sept. 12, 1922.

WITNESSES
Frederick Diehl.

INVENTOR
I. A. ROMMER
BY
ATTORNEY

Patented Sept. 12, 1922.

1,429,166

UNITED STATES PATENT OFFICE.

ISAAC A. ROMMER, OF BROOKLYN, NEW YORK.

GUIDE.

Application filed August 2, 1921. Serial No. 489,321.

*To all whom it may concern:*

Be it known that I, ISAAC A. ROMMER, a citizen of the United States, and a resident of the city of New York, borough of Brooklyn, in the county of Kings and State of New York, have invented a new and Improved Guide, of which the following is a full, clear, and exact description.

My invention relates to an accessory for motor vehicles, and more particularly aims to provide a device in the nature of a guide.

It is a well appreciated fact that numerous accidents have occurred in the operation of motor vehicles incident to the fact that an operator is unable to accurately gage the path which the forward wheels of the motor vehicle will follow. Thus for the most part, operators are incapable of guiding a vehicle in such a manner as to avoid glass fragments and holes in the road.

Further, it is often desirable in accordance with the law to "park" the motor vehicle adjacent to a curb in such a manner that the tires of the same will just clear the curb. Due to the inability of the operator to absolutely gage the distance which exists between the curb and the tires, it is often necessary for him to resort to the expedient of guiding the vehicle until the tires scrape against the curb, which operation results in injury to the tires, and in some instances, to the wheels of the vehicle. Where this is not resorted to, the operator will find that he very often does not comply with the law in that the tires may be spaced from six inches to one foot from the curb rendering the operator liable to arrest.

With this in mind, my present invention is to provide a guide more particularly adapted for use in connection with a motor vehicle and by means of which an operator will be able to accurately determine the path of which the forward wheels will follow when the car is moving in a straight line. Thus my invention provides means whereby an operator will be enabled to follow and ride upon car tracks, avoid foreign matter, such as glass upon the road, also steer clear of holes and by means of which, he will further be able to guide the vehicle to a point adjacent the curb so as to "park" the same with the tires just spaced from the curb in accordance with the law.

Still another object of this invention is the provision of a device of the character stated, which will be extremely simple in construction and which may hence be manufactured at a nominal cost aside from the fact that it may be applied to a motor vehicle, standard construction, within a short space of time.

Still further objects of this invention will appear in the annexed specification taken in connection with the drawings, which latter present one practical embodiment of the same and in which—

Figure 2:
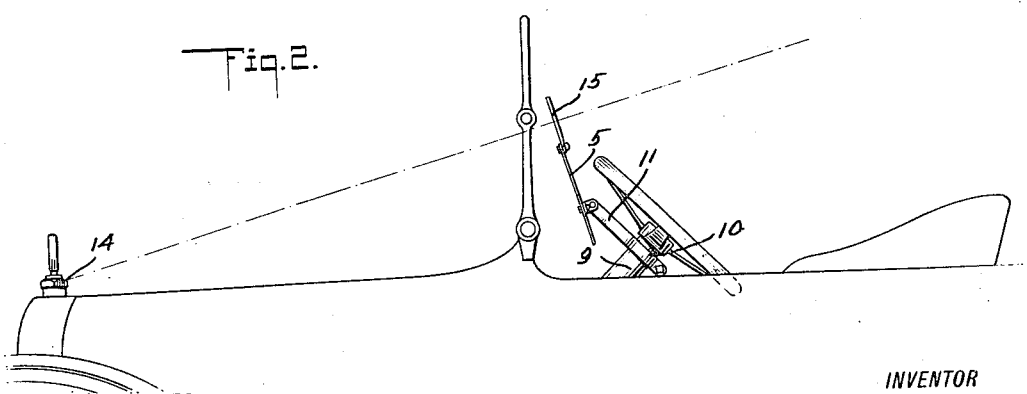

Figure 1 is a perspective view taken from the tonneau of a motor vehicle and showing my improved accessory associated with said vehicle; and Figure 2 is a side elevation of the device as illustrated in Figure 1.

In these views it will be seen that the body of the guide includes a pair of arms 5 which are connected together by means of a pair of links 6 and 6', the latter link being provided with pins 7 adapted to project through longitudinally extending slots 8 formed in the lower ends of each of the arms 5, whereby these latter elements are rendered movable with respect to the link 6.

These parts are now mounted upon a fixed portion of the motor vehicle, such as for instance, the steering post 9 and to accomplish this mounting, I may conveniently utilize an annular clamp 10 which is provided with extensions 11 pivotally connected as at 12 to the link 6'. By this construction, the clamp 10 may be brought to encircle the steering column 9 and the arms 5 are capable of being adjusted with respect to each other to virtually move in any desired position by means of the pivotal connection afforded at 12 as well as the longitudinal adjustment provided by the pin and slot construction 7 and 8.

In use, a bracket 13 is attached to the outer end of one of the arms 5 and this bracket conveniently includes a pair of minor arms, which cooperate to form the rear element of a "sight", the forward element of which consists of a fixed portion of the motor vehicle such as the radiator cap 14. It will be found by an operator that after the sight formed by the elements 13 and 14 is perfect as in Figure 1, that the rods 15 and 16, affixed to the outer ends of both of the arms 5 will be disposed in such a manner as to overlie portions of the supporting surface over which the forward wheels of the vehicle will move if the latter is permitted to continue in a straight line. In other words the arm 16 will hide that portion of the road-way over which the right hand wheel of the vehicle will move while the arm 15 will hide from the eyes of the operator the portion of the road-way over which the left hand wheels of the vehicle will pass. This is of course always contingent upon the fact that the head of the operator is in such a position that the cap 14 appears between the elements 13.

Thus all of the objects set forth in the preamble of the specification are accomplished in that it will be obvious that an operator, after using the device for a certain length of time, will find that it will be a matter of instinct to have the sight formed by the elements 13 and 14 perfect and it will accordingly only be necessary for him to glance at the rods 15 and 16 to ascertain exactly what path the vehicle will follow if allowed to continue in a straight line. By this means, it will readily be appreciated that an operator may avoid obstacles or holes in the road and further that it will be a simple matter for him to bring the car to a position alongside of the curb without rubbing the side walls of the tires against the curb.

Furthermore, by virtue of the fact that the construction of the device will be extremely simple and that the same may be placed upon the market at a nominal figure, and still further, in that the parts are adjustable with respect to each other and the same may be readily associated with and adjusted to properly cooperate with any type of vehicle.

Obvious and numerous modifications of structure might readily be resorted to without in the least departing from my claims, which are—

1. A guide for motor vehicles, including in combination a vehicle, fixed means adapted to be associated therewith for indicating the path of travel of the said vehicle.

2. A guide for motor vehicles, including in combination a vehicle, fixed means adapted to be associated therewith for indicating upon the road in advance of the vehicle the path of travel which will be followed by the same.

3. A guide for motor vehicles, including a body portion adapted to be associated with a vehicle and to be properly disposed with respect to other parts of the same, and fixed means associated with said body portion for indicating the direction of travel of said vehicle over the road.

4. A guide for motor vehicles, including a body portion adapted to be associated with a vehicle and to be properly disposed with respect to other parts of the same, and fixed means associated with said body portion for indicating the direction of travel of said vehicle over the road, if the vehicle is permitted to continue in a straight line.

5. A guide for motor vehicles, including a body portion adapted to be associated with a relatively fixed part of the vehicle, sighting means cooperating with a further fixed portion of said vehicle for indicating when the head of the operator is properly positioned, and fixed indicating means adapted to be viewed by the operator when his head is in said position for indicating the path of travel which will be followed by the wheels of said vehicle, if permitted to move in a straight line.

6. A guide including a body portion, comprising a pair of arms, links extending between said arms, rods associated with said arms, and means providing a sight associated with said body portion said body portion being adapted to be attached to a fixed portion of a vehicle, said sight being adapted to be brought into visual alignment with another fixed portion of the vehicle, said arms being adapted to hide those portions of the surface over which the wheels of the vehicle will travel.

7. A guide including a body portion, comprising a pair of arms, links extending between said arms, rods associated with said arms, means providing a sight associated with said body portion, and means for affixing said body portion to a suitable supporting element, said body portion being adapted to be attached to a fixed portion of a vehicle, said sight being adapted to be brought into visual alignment with another fixed portion of the vehicle, said arms being adapted to hide those portions of the surface over which the wheels of the vehicle will travel.

8. A guide, including a body portion adapted to be supported by a fixed part of a vehicle, means for disposing the same properly with respect to the operator of the vehicle, and rods attached to said body portion, said rods hiding those portions of the road-way to be traveled by the wheels, when the head of the operator is in proper position.

9. A guide including a body portion adapted to be fixed to a part of a vehicle, sighting means associated with said body portion and adapted to co-operate with a second fixed portion of said vehicle to enable an operator of a vehicle to dispose his head in proper position with respect to said guide, and rods carried by said body portion and being adapted to hide from the view of the operator those portions of the roadway over which the wheels of the vehicle will travel.

10. A guide including a body portion, a pair of sighting elements carried by said body portion, said body portion being adapted to be attached to a fixed part of a vehicle, said elements co-operating with a second fixed portion of a vehicle to enable an operator to place his head in proper position with respect to said guide, and means carried by said body for hiding those portions of the road way over which the wheels of the vehicle will pass, from the view of the operator.

11. A guide including a plurality of arms adjustably connected together, rods carried by and movable with respect to said arms, and sighting elements carried by one of said arms and being also movable with respect thereto, said body portion being adapted to be attached to a fixed portion of a vehicle, said sight being adapted to be brought into visual alignment with another fixed portion of the vehicle, said arms being adapted to hide those portions of the surface over which the wheels of the vehicle will travel.

ISAAC A. ROMMER.